United States Patent [19]
Carroll et al.

[11] Patent Number: 5,758,738
[45] Date of Patent: Jun. 2, 1998

[54] AUTOMOTIVE VEHICLE POWER TRAIN ARRANGEMENT

[75] Inventors: Jeffrey P. Carroll, Farmington Hills; Diamond G. Ferraiuolo, Milford, both of Mich.

[73] Assignee: Chrysler Corporation, Auburn Hills, Mich.

[21] Appl. No.: 617,157

[22] Filed: Mar. 18, 1996

[51] Int. Cl.⁶ ............................................. B60K 17/00
[52] U.S. Cl. ...................... 180/292; 180/375; 180/378
[58] Field of Search ............................ 180/292, 374, 180/375, 378, 379, 380, 381, 382, 383, 384, 352, 354; 464/88, 92, 93

[56] References Cited

U.S. PATENT DOCUMENTS

| | | | |
|---|---|---|---|
| 1,261,683 | 4/1918 | Behn | 464/92 |
| 1,617,931 | 2/1927 | Wilson | 464/76 |
| 1,812,141 | 6/1931 | Dobbins | 464/58 |
| 2,140,876 | 12/1938 | Klavik | 180/383 |
| 2,305,936 | 12/1942 | Tjaarda | 180/292 |
| 2,963,106 | 12/1960 | Sampietro | 180/379 |
| 3,155,187 | 11/1964 | DeLorean | 180/380 |
| 3,231,039 | 1/1966 | Saurer | 180/383 |
| 3,292,389 | 12/1966 | Adloff et al. | 464/97 |
| 3,305,040 | 2/1967 | Cadiou | 180/292 |
| 3,528,263 | 9/1970 | Stern | 464/88 |
| 4,273,207 | 6/1981 | Sivers et al. | 180/380 |

FOREIGN PATENT DOCUMENTS

| | | | |
|---|---|---|---|
| 56-17724 | 2/1981 | Japan | 180/378 |
| 643073 | 9/1950 | United Kingdom | 180/378 |

OTHER PUBLICATIONS

BMW – Shop Manual, Series 3. No Date.

*Primary Examiner*—Peter C. English
*Assistant Examiner*—Frank Vanaman
*Attorney, Agent, or Firm*—Kenneth H. MacLean

[57] ABSTRACT

A power train arrangement for an automotive vehicle having a front mounted internal combustion engine and a rear mounted automatic transaxle unit which are interconnected by a single one-piece propeller shaft which is in substantial axial alignment with the output shaft of the engine and the input shaft of the transaxle and which is connected to each of the shafts by a flexible coupling member.

9 Claims, 4 Drawing Sheets

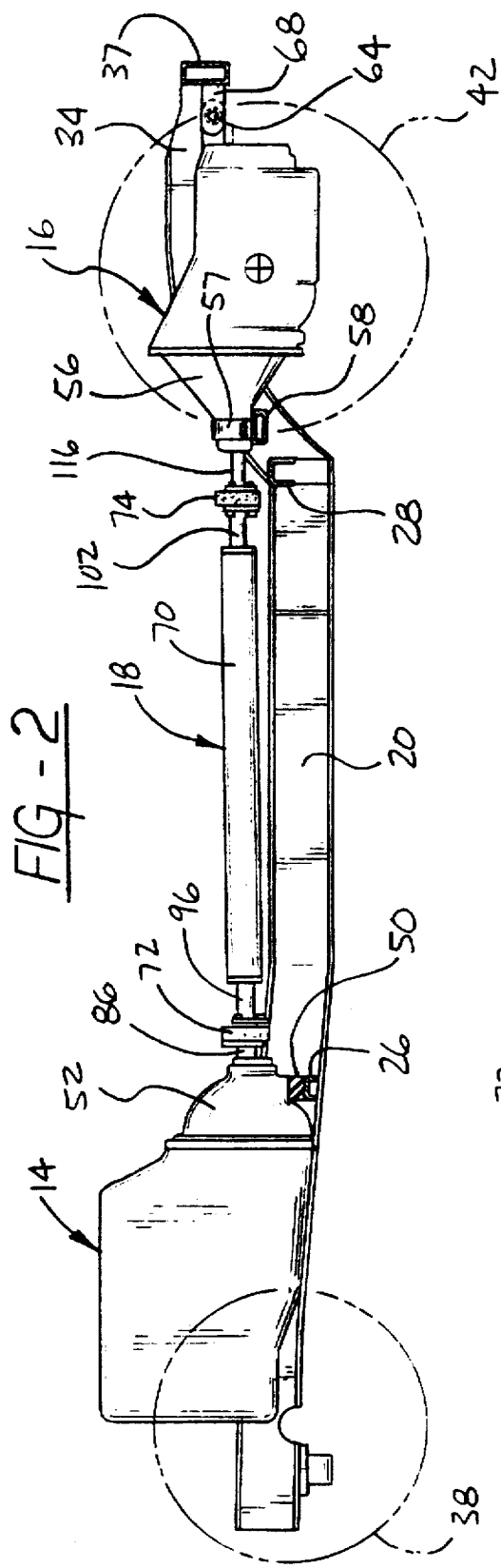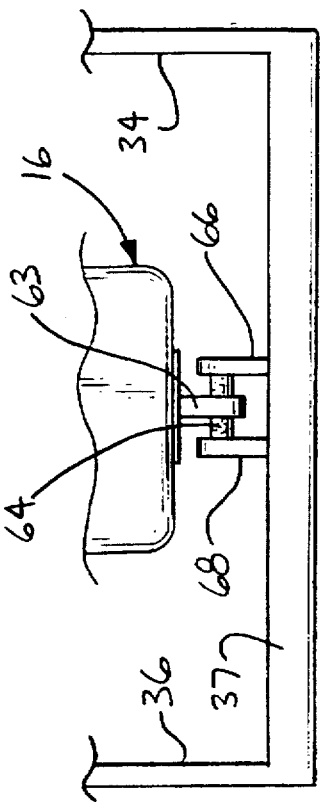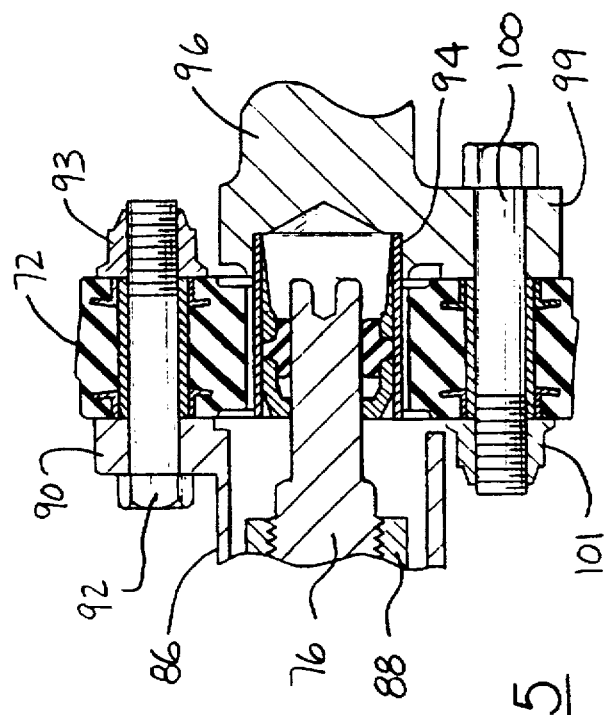

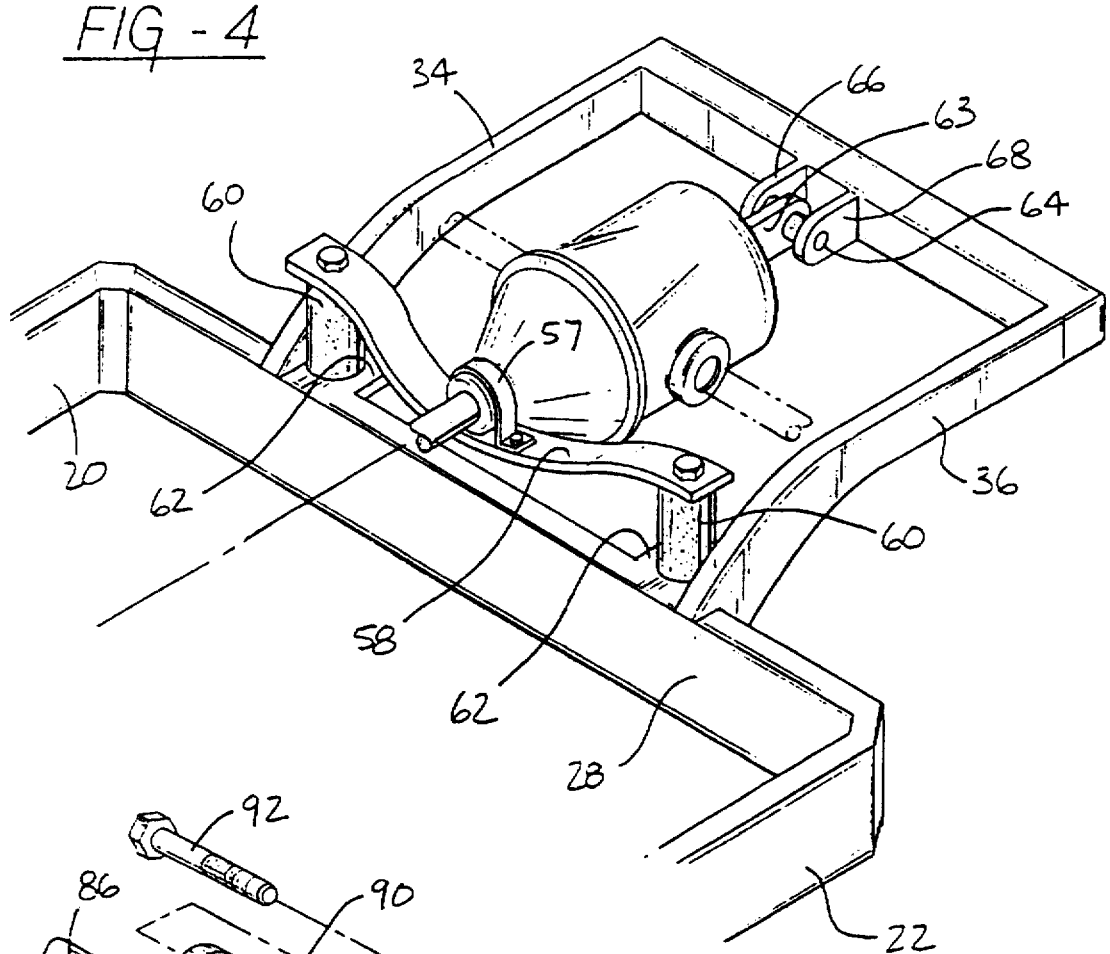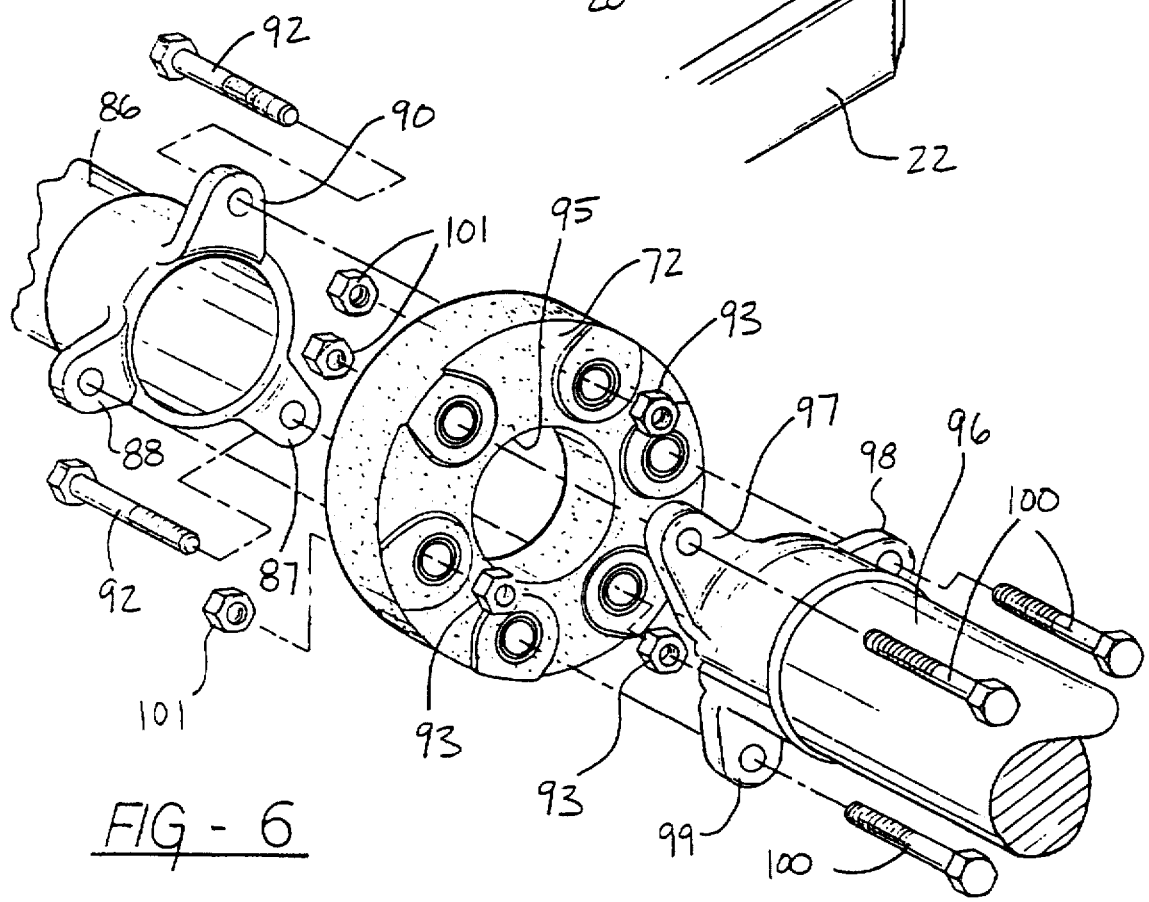

5,758,738

AUTOMOTIVE VEHICLE POWER TRAIN ARRANGEMENT

This invention concerns automotive vehicles and more particularly relates to a power train arrangement for an automotive vehicle having a front mounted engine and a rear mounted combination transmission and differential unit.

BACKGROUND OF THE INVENTION

There have been various automotive vehicle power train arrangements proposed or used in which the internal combustion engine is located at the front of the vehicle and the combined transmission and differential unit (hereinafter referred to as "transaxle") is located at the rear of the vehicle. One advantage of an engine-transaxle arrangement of this sort is that the vehicle weight is more evenly distributed over the front and rear wheels of the vehicle. Another advantage of this type of engine-transaxle arrangement is vehicle packaging. The separation of the transaxle from the engine allows for more longitudinal space for packaging of the passenger compartment closer to the front of the vehicle.

One example of a power train arrangement of this sort can be seen in U.S. Pat. No. 2,963,108 issued on Dec. 6, 1960 in the name of A. C. Sampietro and entitled "Power Transmission Mechanism for Automobile Vehicles". In this patent, the engine is arranged with its axis inclined downwardly and rearwardly while the axis of the transaxle at the rear of the vehicle is inclined downwardly and forwardly so as to minimize or eliminate the usual upwardly projecting tunnel in the floor of the vehicle. In addition, Sampietro uses conventional double universal joints to connect the output shaft of the engine and the input shaft of the transaxle to the propeller shaft.

Also, in U.S. Pat. No. 3,231,039 issued on Jan. 25, 1966 in the name of C. Saurer and entitled "Automotive Vehicle Drive Shaft Assembly", a power train arrangement is disclosed that is similar to that seen in the above-mentioned Sampietro patent and is intended to serve the same purpose, namely, to eliminate the hump or tunnel in the vehicle floor. In this instance, however, rather than using universal joints for interconnecting the engine and transaxle with the propeller shaft, Saurer utilizes a pair of flexible couplings capable of deflecting relative to substantially any plane.

Another power train arrangement in which the engine axis and the transaxle axis are tilted downwardly towards each other for the same purpose as in the Sampietro and Saurer patents is disclosed in U.S. Pat. No. 3,292,389 issued on Dec. 20, 1966 in the name of J. A. Adloff et al. and entitled "Vibration-Damped Drive Shaft". In the Adloff et al. arrangement, the propeller shaft is held in a stressed curve shape within a curved protecting tube which rigidly connects the engine to the transaxle.

In addition, a power train arrangement in which the engine is located at the frontal part of the vehicle and the transaxle is positioned at the rear can be found in an automotive vehicle presently manufactured by Porsche of Stuttgart, Germany. As with the above-mentioned Adloff et al arrangement, the Porsche vehicle has the engine rigidly connected to the transaxle by a central tube in which the propeller shaft is located. However, the Porsche arrangement differs from the Adloff et al arrangement in that the axis of the engine output shaft and the axis of the transaxle's input shaft are axially aligned so that the propeller shaft takes the form of a straight member. A similar arrangement is shown in U.S. Pat. No. 4,273,207 issued in the name of Rolf V. Sivers et al. and entitled "Supporting Pipe To Constitute a Drive Unit For An Automotive Vehicle". In this instance, however, the engine is connected to the rear transmission unit by a central tube or supporting pipe which an outer pipe and an inner pipe fitted therein and held in position through a friction seat.

SUMMARY OF THE INVENTION

The present invention concerns a new and improved power train arrangement that has some similarity to those described above in that the engine is mounted at the front end of a vehicle frame and the transaxle unit is located at the rear of the frame. The present invention, however, differs from the power train arrangements disclosed in the Sampietro, Saurer, and Adloff in that the axis of the engine and the axis of the transaxle are substantially aligned and the system is provided with components which eliminate back lash between the engine and the transaxle that may be caused by the use of cardan type universal joints, slip yokes, spline interfaces, or gearing which could allow the components to move relative to one another and thereby cause rattles. This invention also differs from the power train arrangement used in the Porsche vehicle and that disclosed in the Sivers et al. patent by not utilizing a weight-and-cost adding member such as a central tube for rigidly interconnecting the engine and transaxle.

More specifically, the new and improved power train arrangement made in accordance with the present invention is achieved by hard coupling the engine output shaft to the drive plate on the crankshaft flange and by using flexible rubber couplings within the propeller shaft assembly. The rubber couplings serve several functions. They transmit torque from the engine output shaft to the propeller shaft and from the propeller shaft to the transaxle input shaft. They also absorb shock loads in a rotational, angular, and axial direction. In the rotational direction, the flexible rubber couplings partially damp out the torque peaks produced by the engine and prevent the propeller shaft from conducting noise. In addition, both the engine and transaxle are isolated from the vehicle frame through the use of mountings containing rubber or rubber like material in order to minimize noise, vibration and harshness that might be generated during operation of the engine and transaxle. In this regard, and in the preferred form of the invention, the front end of the transaxle is rigidly mounted on a cradle which, in turn, is connected at its outboard ends to the frame through resilient mounting means. Moreover, the rear end of the transaxle is connected to the vehicle frame by a transversely extending pivotal connection which allows limited pivotal movement of the transaxle when the latter is subjected to high engine torque.

Accordingly, an object of the present invention is to provide a new and improved power train arrangement for an automotive vehicle that includes a driveline between a front mounted internal combustion engine and rear mounted transaxle that has the output shaft of the engine and the input shaft of the transaxle connected to a substantially axially aligned propeller shaft by flexible coupling members.

Another object of the present invention is to provide a new and improved power train arrangement for an automotive vehicle having a front mounted internal combustion engine and a rear mounted automatic transaxle unit which are interconnected by a single one-piece propeller shaft which is in substantial axial alignment with the output shaft of the engine and the input shaft of the transaxle and which is connected to each of the shafts by a flexible coupling member.

Yet another object of the present invention is to provide a new and improved power train arrangement for an automotive vehicle in which an engine is supported at the front of the vehicle chassis by three cushion mountings and a transaxle is supported at the rear of the chassis by three cushion mountings one of which allows the transaxle to have limited pivotal movement about a transversely extending axis when the transaxle is subjected to sudden increased engine torque and in which a flexible coupling member is interposed between the output shaft and input shaft of the engine and transaxle, respectively, and a substantially aligned propeller shaft.

Other objects, features, and advantages of the present invention will become apparent to those skilled in the art from the following detailed description when taken with the drawings in which:

BRIEF DESCRIPTION OF THE DRAWINGS

FIG. 2 is an elevational view of the automotive vehicle chassis taken on line 2—2 of FIG. 1;

FIG. 4 is a perspective view showing the manner that the transaxle of the power train arrangement is supported by the vehicle chassis;

FIG. 5 is an enlarged sectional view of one of the rubber coupling incorporated in the drive line portion of the power train arrangement seen in FIGS. 1–4;

FIG. 6 is an exploded view showing the construction of certain driveline components which interconnect with a rubber coupling employed by the power train arrangement; and FIG. 7 is an enlarged plan view showing the manner that the rear end of the transaxle is connected to the vehicle chassis.

DETAILED DESCRIPTION OF THE INVENTION

Figure 1:
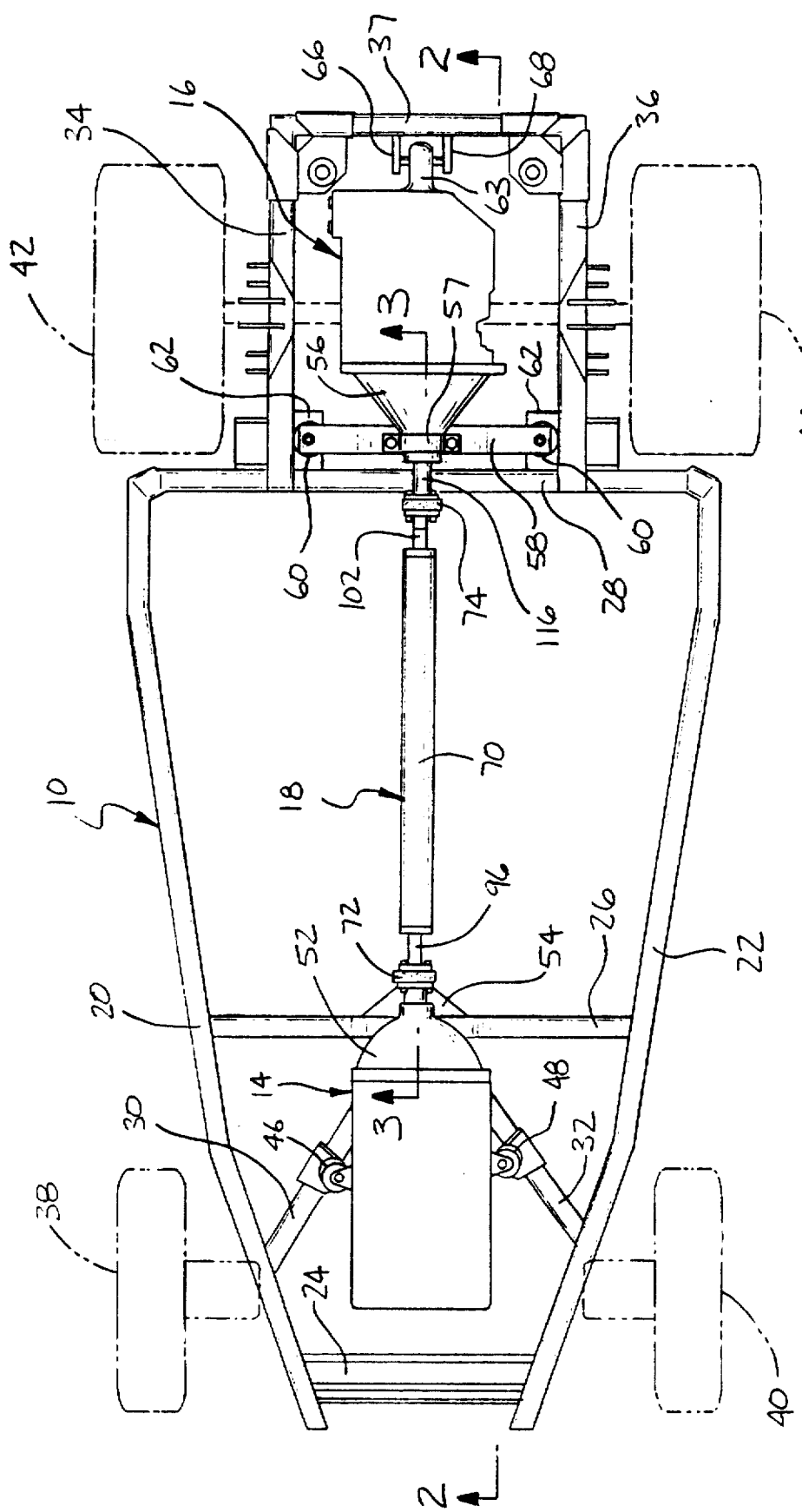
FIG. 1 is a plan view of an automotive vehicle chassis incorporating a power train arrangement made in accordance with the present invention.

Referring now to the drawings and more particularly to FIGS. 1 and 2 thereof, an automotive vehicle chassis is shown which includes a vehicle frame 10 on which is mounted a power train arrangement made in accordance with the present invention and comprising an internal combustion engine 14, a transaxle unit 16, and a driveline assembly 18 which interconnects the engine 14 to the transaxle unit 16.

As best seen in FIG. 1, the vehicle frame 10 consists of a front frame section which is secured to a generally U-shaped rear frame section. The front frame section includes a pair of converging side rails 20 and 22 rigidly interconnected by three transversely extending cross members 24, 26, and 28. The front frame section also includes a pair of outwardly diverging engine support members 30 and 32 the front ends of which are secured to the side rails 20 and 22 while the rear ends are secured to the midsection of the cross member 26. The rear frame section includes a pair of laterally spaced and parallel side rails 34 and 36 connected at their front ends to cross member 28 and connected at their rear ends to a transversely extending cross member 37. It will be understood that, as is conventional, the front frame section and the rear frame section include suspension components (not shown) for supporting a pair of steerable front wheels 38 and 40 and a pair of rear wheels 42 and 44 which receive drive from the transaxle unit 16.

More specifically, the engine 14 is mounted on the front frame section by a three-point suspension consisting of a pair of front rubber support cushions 46 and 48 which connect the opposite sides of the engine 14 to the support members 30, 32, and a rear rubber support cushion 50 which connects a bell housing 52 secured to the rear end of the engine 14 to a bracket 54 fixed with the cross member 26. As is conventional, the front support cushions 46 and 48 are designed to support the weight of the engine and control its torsional characteristics. The rear support cushion 50 supports part of the weight of the engine 14 and provides a connection through which the thrust from the rear wheels 42 and 44 is transmitted to the chassis frame 10.

Similarly, as seen in FIGS. 1, 2, and 4, the transaxle unit 16 is mounted on the rear frame section by a three-point suspension. In this case, however, a bell housing 56 fixed with the front end of the transaxle unit 16 is rigidly secured by a bracket 57 to a transversely extending cradle member 58 midway of the opposed ends thereof. Each of the opposed ends of the cradle member 58, in turn, is connected by a rubber support cushion 60 to a gusset 62 rigid with the associated side rail of the rear frame section and the cross member 28 of the front frame section. As seen in FIG. 4 and 7, the rear end of the transaxle unit 16 has a tongue 63 rigidly connected therewith that is pivotally connected to the cross member 37 by a transversely extending pin 64 supported at its opposed ends by bracket members 66 and 68 fixed with the cross member 37. Although not shown, a cushion member made of synthetic rubber or other suitable resilient material is interposed between the tongue 63 of the transaxle unit 16 and the pin 64 to also provide a cushioning effect at the rear end of the transaxle unit 16.

Figure 3:
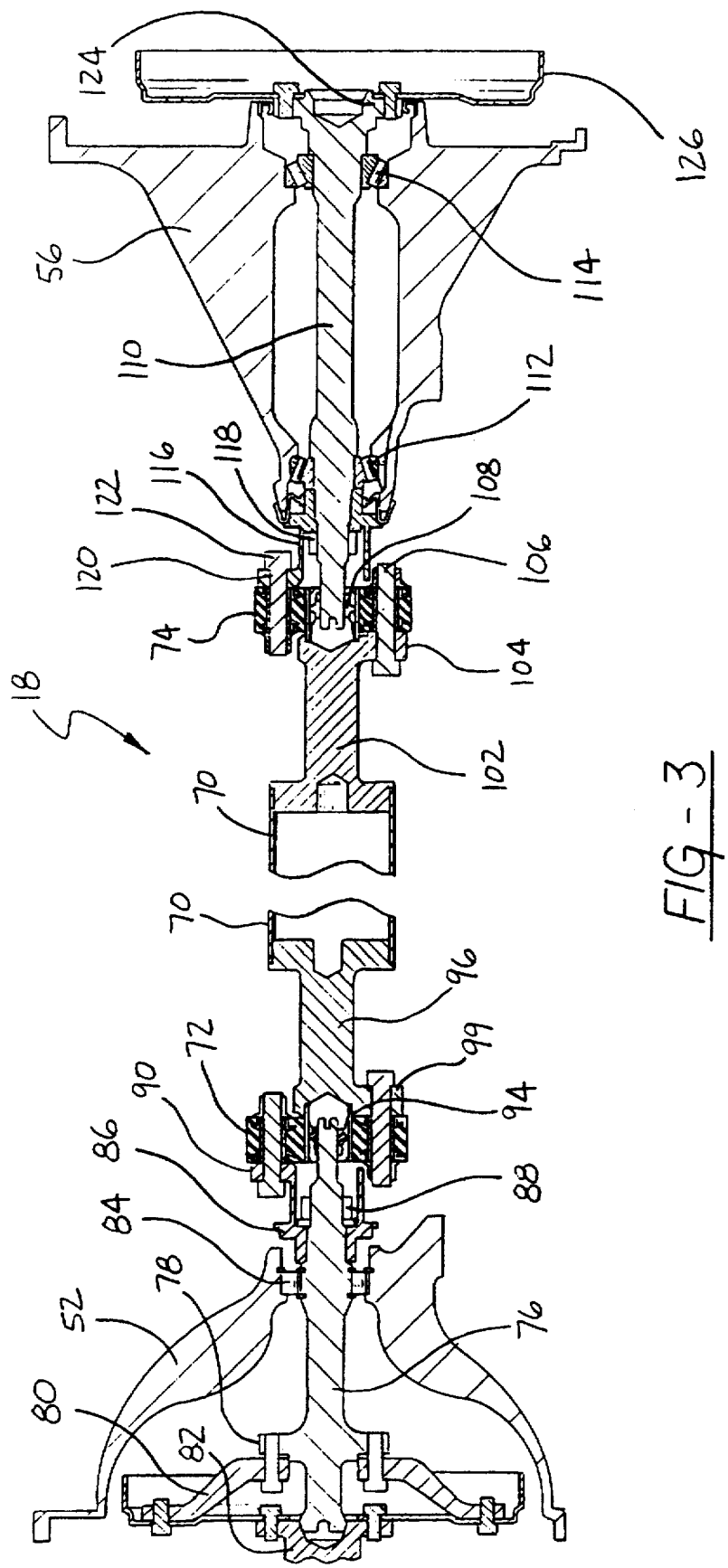
FIG. 3 is an enlarged sectional view of the driveline portion of the power train arrangement taken on line 3—3 of FIG. 1.

FIG. 3 shows the driveline assembly 18 of the power train arrangement according to the present invention. As seen in FIG. 3, the bell housing 52 at the rear of the engine 14 contains the parts to be described which connect the engine 14 to the front end of a drive or propeller shaft 70 through a rubber flexible coupling member 72. Also, the bell housing 56 at the front of the transaxle unit 16 contains parts to be described which connect the rear end of the propeller shaft 70 through a rubber flexible coupling member 74 to the torque converter (not shown) of the transmission (not shown) which is drivingly connected to a differential gearing within the transaxle unit 16.

With reference to FIG. 3, it will be noted that within the bell housing 52 fixed to the engine 14 is an output shaft 76 provided with an integrally formed radially extending flange 78. The flange 78 is bolted to a flex plate 80 which, in turn, is bolted to the crankshaft 82 of the engine 14. The rear portion of the output shaft 76 is supported for rotation within the bell housing 52 by a ball bearing 84 and has a flange member 86 splined thereon that is maintained in fixed position on the output shaft 76 and prevented from moving axially relative thereto by a nut 88 threaded on a reduced diameter portion of the output shaft 76. As seen in FIG. 6, the flange member 86 is formed with a rearwardly extending sleeve which is integral with three circumferentially equally spaced and radially outwardly extending fingers 87, 88, and 90 one of which is only shown in FIG. 3. Each of the fingers 87, 88, and 90 of flange member 86 is secured by a bolt 92 and nut 93 to one side of the flexible coupling member 72. As seen in FIGS. 3 and 5, the rear terminal end of the output shaft 76 is further reduced in diameter and located within a cylindrical bushing 94 mounted in an opening 95 formed in the center of the flexible coupling member 72. As seen in FIGS. 3, 5 and 6, a flange member 96, rigidly secured to the front end of the propeller shaft 70, is also formed with three circumferentially equally spaced and radially extending fingers 97, 98, and 99 each of which is bolted to the flexible coupling member 72 at the other side thereof by bolts 100 and nuts 101 separate and circumferentially spaced from the bolts 92 used to bolt the flange member 86 to the flexible coupling member 72. (It will be noted that for clarity purposes, the terminal end of the output shaft 76 and the bushing 94 are not shown in FIG. 6)

With reference still to FIG. 3, the rear end of the propeller shaft 70 is rigidly secured to a flange member 102 which is identical in construction to the flange member 96 at the front end of the propeller shaft 70. Also, as with the flange member 96, each of the three fingers (one of which only is shown and is identified by reference numeral 104) of the flange member 102 is connected to one side of the flexible coupling 74 by a bolt such as the bolt identified by reference numeral 106.

As in the case of the flexible coupling 72, the flexible coupling 74 is formed with a central opening which supports a cylindrical bushing 108 which, in turn, supports the front end of an input shaft 110 supported for rotation by a pair of axially spaced roller thrust bearings 112 and 114 mounted within the bell housing 56 of the transaxle unit 16. In addition, adjacent the front end of the input shaft 110, a flange member 116 similar to the flange member 86 on the output shaft 76 is splined onto the input shaft 110 and also maintained in a fixed position thereon by a nut 118 threaded onto the input shaft 110. The front end of the flange member 116 is formed with three circumferentially equally spaced and radially outwardly extending fingers (one of which is only shown and identified by reference numeral 120) each of which is bolted to the other side of the flexible coupling 74 by a bolt 122 in the manner of the flange member 96 secured to the front end of the propeller shaft 70. The rear end of the input shaft 110 is integrally formed with a radially outwardly extending flange 124 bolted to a drive plate 126 which is attached to the torque converter of the automatic transmission of the transaxle unit 16.

From the above description it should be apparent that the power train arrangement according to the present invention does not have any components between the output shaft 76 and the input shaft 110 that could provide backlash in the system and create noise such as could occur with gearing used in the aforementioned Saurer patent or as could occur with conventional Cardan or Hooke universal joints commonly used in drivelines and shown in the aforementioned Sampietro patent. Also, apart from not causing any noise during low and high RPM engine operation, the flexible couplings 72 and 74 will allow for some limited axial movement of the propeller shaft relative to the engine and transaxle unit. One further advantage of using the flexible couplings 72 and 74 in this power train arrangement is that the output shaft 76 connected to the engine crankshaft and the input shaft 110 connected to the torque converter need not be in perfect axial alignment with the center longitudinal axis of the propeller shaft 70. In an actual application of this power train arrangement in a Chrysler Prowler vehicle, the longitudinal center axis of the output shaft 76 was offset from the longitudinal center axis of the propeller shaft 70 by 1.05 degrees while the longitudinal center axis of the input shaft 110 was offset from the longitudinal center axis of the propeller shaft 70 by 1.50 degrees without disturbing the substantially quiet and vibrationless operation of the power train arrangement.

In addition, it will be noted that the manner the transaxle unit 16 is supported by the chassis frame 10 of the vehicle plays a part in providing a power train arrangement which operates without creating any unacceptable noise, vibration or harshness (NVH) problem. In this regard and as indicated above, the transaxle unit 16 has the front end thereof carried by a cradle member 58 which, in turn, is connected to the vehicle frame 10 through support cushion means 60. The cushion means 60 could be of the same construction as that of the cushion means 46 and 48 supporting the engine 14. Similarly, cushioning means is provided at the rear end of the transaxle unit 16 while at the same time allowing for some limited pivotal movement of the transaxle unit 16 about a transverse axis if the transaxle unit 16 is subjected to a sudden high engine torque. The latter could occur, of course, if the vehicle operator should jam down the accelerator pedal from a standing start.

It will also be noted that the flexible coupling members 72 and 74 are identical in construction and are essentially the same in construction as those presently used on BMW vehicles Model 3-series manufactured by the Bavarian Motor Works of Germany and on the Lexus vehicle Model LS 400 manufactured by Toyota Motor Company of Japan. One major difference between the power train arrangements used on both of these vehicles and the power train arrangement made according to this invention is that the former has the transmission directly connected to the engine and supported at the front of the vehicle rather than at the rear as in this case. In addition, both the BMW and Lexus vehicles utilize a two-piece propeller shaft with both parts joined together by a Cardan or Hooke universal joint.

Various changes and modifications can be made in the construction of the power train arrangement which is the subject of this patent without departing from the spirit of the invention. Such changes and modifications are contemplated by the inventors and they do not wish to be limited except by the scope of the appended claims.

The embodiment of the invention in which an exclusive property or privilege is claimed are defined as follows:

1. In an automotive vehicle having a frame supporting a power train arrangement, said power train arrangement including an engine mounted at the front end of said frame, a first housing connected to said engine for supporting an output shaft, a transaxle unit located at the rear of said frame and having an input shaft extending towards said output shaft of said engine, said transaxle unit having a front end and a rear end, a second housing secured to said front end of said transaxle unit for supporting said input shaft and being connected to said frame through resilient mounting means, a pivotal connection serving to connect the rear end of said transaxle unit to said frame and cooperating with said resilient mounting means to permit limited pivotal movement of said transaxle unit about an axis extending transversely to the longitudinal axis of said frame, a drive shaft extending between said output shaft of said engine and said input shaft of said transaxle unit and being substantially axially aligned with said input shaft and said output shaft, a first flexible coupling connecting one end of said drive shaft to said output shaft of said engine, and a second flexible coupling connecting the other end of said drive shaft to said input shaft of said transaxle unit, said power train arrangement being such that said drive shaft and said first and second flexible couplings constitute the sole direct connecting means between said first housing and said second housing and between said output shaft and said input shaft so as to allow said transaxle unit to pivot about said pivotal connection when said input shaft of said transaxle unit is subjected to sudden high engine torque.

2. In an automotive vehicle having a frame supporting a power train arrangement, said power train arrangement including an engine mounted at the front end of said frame, a first housing connected to said engine for supporting an output shaft, a transaxle unit located at the rear of said frame and having an input shaft extending towards said output shaft of said engine, said transaxle unit having a front end and a rear end, a second housing secured to the front end of said transaxle unit for supporting said input shaft, a cradle member supporting said second housing of said transaxle unit and being connected to said frame at spaced points through resilient mounting means, a pivotal connection serving to connect the rear end of said transaxle unit to said frame and cooperating with said resilient mounting means to permit limited pivotal movement of said transaxle unit about an axis extending transversely to the longitudinal axis of said frame, a drive shaft extending between said output shaft of said engine and said input shaft of said transaxle unit and being substantially axially aligned with said input shaft and said output shaft, a first rubber coupling connecting one end of said drive shaft to said output shaft of said engine, and a second rubber coupling connecting the other end of said drive shaft to said input shaft of said transaxle unit, said power train arrangement being such that said drive shaft and said first and second rubber couplings constitute the sole direct connecting means between said first housing and said second housing and between said output shaft and said input shaft so as to allow said transaxle unit to pivot about said pivotal connection when said input shaft of said transaxle unit is subjected to sudden high engine torque.

3. In an automotive vehicle having a frame supporting a power train arrangement, said power train arrangement including an engine mounted at the front end of said frame, a first housing connected to said engine for supporting an output shaft, a transaxle unit located at the rear of said frame and having an input shaft extending towards said output shaft of said engine, said transaxle unit having a front end and a rear end, a second housing secured to the front end of said transaxle unit for supporting said input shaft, a cradle member in the form of a cross bar supporting said second housing of said transaxle unit and being connected to said frame at the outer ends of said cross bar through resilient mounting means, a pivotal connection serving to connect said rear end of said transaxle unit to said frame and cooperating with said resilient mounting means to permit limited pivotal movement of said transaxle unit about an axis extending transversely to the longitudinal axis of said frame, a single piece drive shaft extending between said output shaft of said engine and said input shaft of said transaxle unit and being substantially axially aligned with said input shaft and said output shaft, a first rubber coupling connecting one end of said drive shaft to said output shaft of said engine, and a second rubber coupling connecting the other end of said drive shaft to said input shaft of said transaxle unit, said power train arrangement being such that said drive shaft and said first and second rubber couplings constitute the sole direct connecting means between said first housing and said second housing and between said output shaft and said input shaft of said transaxle unit and allow said transaxle unit to pivot about said pivotal connection when said input shaft of said transaxle unit is subjected to sudden high engine torque.

4. The automotive vehicle as set forth in claim 3 wherein said front end of said transaxle unit is rigidly connected to the mid-section of said cross bar.

5. The automotive vehicle as set forth in claim 4 wherein a tongue is rigidly connected to said rear end of said transaxle unit.

6. The automotive vehicle as set forth in claim 5 wherein said pivotal connection includes an aperture through said tongue and a transversely extending pin extending through said apertured tongue of said transaxle unit.

7. The automotive vehicle as set forth in claim 3 wherein said output shaft and said input shaft are each connected to the associated rubber coupling by a flange member having three circumferentially equally spaced and radially outwardly extending fingers.

8. The automotive vehicle as set forth in claim 7 wherein said one end of said drive shaft and said other end of said drive shaft are rigidly connected to the associated rubber coupling by a flange member having three circumferentially equally spaced and radially outwardly extending fingers.

9. The automotive vehicle as set forth in claim 8 wherein said output shaft and said input shaft each terminate at one end with an integral portion which extends into a bushing located in a cylindrical opening centrally formed in the associated rubber coupling.

\* \* \* \* \*